(12) United States Patent
Rudwal et al.

(10) Patent No.: US 9,694,857 B2
(45) Date of Patent: Jul. 4, 2017

(54) FENDER FOR A WHEELED VEHICLE

(71) Applicant: BOMBARDIER RECREATIONAL PRODUCTS INC., Valcourt (CA)

(72) Inventors: Christopher Rudwal, Paris (FR); Simon Carboneau, Magog (CA); Nicolas Deluy, Boulogne-Billancourt (FR); David Laroche, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 0 days.

(21) Appl. No.: 14/429,614

(22) PCT Filed: Sep. 18, 2013

(86) PCT No.: PCT/US2013/060266
§ 371 (c)(1),
(2) Date: Mar. 19, 2015

(87) PCT Pub. No.: WO2014/047093
PCT Pub. Date: Mar. 27, 2014

(65) Prior Publication Data
US 2015/0274213 A1   Oct. 1, 2015

Related U.S. Application Data

(60) Provisional application No. 61/702,900, filed on Sep. 19, 2012.

(51) Int. Cl.
*B62D 25/18* (2006.01)
*B62J 15/02* (2006.01)
*B62D 25/16* (2006.01)

(52) U.S. Cl.
CPC ............. *B62D 25/18* (2013.01); *B62J 15/02* (2013.01); *B62D 25/163* (2013.01)

(58) Field of Classification Search
None
See application file for complete search history.

(56) References Cited

U.S. PATENT DOCUMENTS

| | | | |
|---|---|---|---|
| 5,323,869 A | 6/1994 | Kurayoshi et al. | |
| 5,775,454 A * | 7/1998 | Scherbarth | B62K 25/16 180/219 |

(Continued)

FOREIGN PATENT DOCUMENTS

| | | |
|---|---|---|
| CN | 2263616 Y | 10/1997 |
| CN | 2417100 Y | 1/2001 |

(Continued)

OTHER PUBLICATIONS

The extended European search report with regard to 13838931.7-1760 / 2897852 PCT/US2013060266 issued on Oct. 14, 2015.

(Continued)

*Primary Examiner* — John Walters
*Assistant Examiner* — Hilary L Johns
(74) *Attorney, Agent, or Firm* — BCF LLP

(57) ABSTRACT

A fender for a wheeled vehicle has an arcuate fender body and a brace. The fender body has an inner surface and an outer surface. The inner surface is adapted to face a wheel of the vehicle. The brace has a first end and a second end. The first end is disposed on and connected to the outer surface of the fender body. The second end is adapted to connect to the vehicle. The second end is spaced from the fender body and is disposed radially inward of the first end. A wheeled vehicle having the fender disposed on a wheel thereof is also described.

12 Claims, 7 Drawing Sheets

(56) References Cited

U.S. PATENT DOCUMENTS

| | | | |
|---|---|---|---|
| 6,109,621 A | 8/2000 | Hettich et al. | |
| 6,431,605 B1* | 8/2002 | Miller | B60Q 1/30 116/28 R |
| 2002/0096859 A1* | 7/2002 | Versaw | B60D 1/00 280/511 |
| 2005/0001454 A1* | 1/2005 | Rush | B62D 25/166 296/198 |
| 2007/0267237 A1 | 11/2007 | Hanson et al. | |
| 2008/0023242 A1 | 1/2008 | Lachapelle et al. | |

FOREIGN PATENT DOCUMENTS

| | | | |
|---|---|---|---|
| CN | 101291841 A | | 10/2008 |
| DE | 3214901 A1 | * | 10/1983 |
| DE | 3214901 A1 | | 10/1983 |
| GB | 310781 A | | 4/1929 |

OTHER PUBLICATIONS

International Search Report of PCT/US2013/060266; Feb. 21, 2014, Blaine R. Copenheaver.
English abstract of DE3214901, retrieved from http://worldwide.espacenet.com/ on Mar. 18, 2015.
Bombardier Recreational Products Inc.; BRP—Part Catalog; Roadster/2010/Spyder/Spyder RT, RTS Roadster SE5, Sep. 2010—Body and Accessories, Front; retrieved from internet on Mar. 19, 2015.
English Abstract of CN101291841 retrieved on Espacenet on Jun. 7, 2016.
English Abstract of CN2417100 retrieved on Espacenet on Jun. 7, 2016.
English Abstract of CN2263616 retrieved on Espacenet on Jun. 7, 2016.

* cited by examiner

FENDER FOR A WHEELED VEHICLE

CROSS-REFERENCE

The present application claims priority to U.S. Provisional Patent Application No. 61/702,900, filed Sep. 19, 2012, the entirety of which is incorporated herein by reference.

FIELD OF THE INVENTION

The present invention relates to fenders for wheeled vehicles and wheeled vehicles provided with fenders.

BACKGROUND

Fenders are used to help prevent or at least reduce the amount of water and debris take could be projected rearward by a rotating wheel. In some vehicles, the fenders are fixed to the vehicle body or frame. In other vehicles, the fenders are connected to wheel support structures, such as suspension elements, so as move with the wheel as they travel over uneven terrain.

However, one of the disadvantages of fenders is that due to the space between the fender and the wheel and that the fenders are in contact with the incoming air when the vehicle is in movement, the fenders act like "air scoops", thus creating drag.

One way to reduce the amount of drag caused by the fenders consists in diminishing the space between the inner surface of the fenders and the wheels. However, in cases where the fenders are connected to wheel support structures so as to move with the wheels, the minimal dimension of this space is often determined by the braces used to connect the fenders to the suspension elements. In order for the braces not to be apparent, they are disposed on the inner surfaces of the fenders, between the fenders and the wheels. Thus, the minimal dimension of the space between a fender and its corresponding wheel has to be slightly larger than the thickness of the braces.

There is therefore a need for a fender that can be connected to a wheel support structure of a wheel in a manner so as to limit the amount of drag created by the fender.

SUMMARY

It is an object of the present invention to ameliorate at least some of the inconveniences present in the prior art.

In one aspect, embodiments of the present invention provide a fender for a wheeled vehicle having an arcuate fender body and a brace. The fender body has an inner surface and an outer surface. The inner surface is adapted to face a wheel of the vehicle. The brace has a first end and a second end. The first end is disposed on and connected to the outer surface of the fender body. The second end is adapted to connect to the vehicle. The second end is spaced from the fender body and is disposed radially inward of the first end.

In an additional aspect, a fender side portion is connected to a side of the fender body on a first side of the fender. A radially inward edge of the fender side portion is more radially inward than a radially inward edge of a second side of the fender opposite the first side.

In a further aspect, a fender side portion is connected to a side of the fender body. A portion of the brace located between the first and second ends of the brace is disposed between the fender side portion and longitudinal center plane of the fender body.

In an additional aspect, the fender side portion is fastened to the portion of the brace.

In a further aspect, at least a portion of a radially inward edge of the fender side portion is disposed between the portion of the brace and the longitudinal center plane of the fender body.

In an additional aspect, the fender side portion and the fender body are integrally formed.

In a further aspect, a cover is disposed on the outer surface of the fender body. The cover covers at least the first end of the brace. The first end of the brace is disposed between the cover and the outer surface of the fender body.

In an additional aspect, the first end of the brace is fastened by fasteners to the fender body. The cover covers the fasteners.

In a further aspect, at least one reflector is disposed on the cover.

In an additional aspect, the cover is fastened by fasteners to the fender body. The reflector is disposed over at least one of the fasteners.

In a further aspect, the brace is a first brace. The fender also has: a second brace having a first end and a second end, the first end of the second brace being disposed on and connected to the outer surface of the fender body, the second end of the second brace being adapted to connect to the vehicle, the second end of the second brace being spaced from the fender body and being disposed radially inward of the first end of the second brace. The second ends of the first and second braces are disposed on a same side of a longitudinal centerline of the fender body.

In an additional aspect, the first end of the first brace is disposed on a top portion of the fender body and the first end of the second brace is disposed on a rear portion of the fender body.

In a further aspect, a cover is disposed on an outer surface of the fender body. The cover covers at least the first ends of the first and second braces. The first ends of the first and second braces are disposed between the cover and the outer surface of the fender body.

In one aspect, embodiments of the present invention provide a wheeled vehicle having a frame, a motor connected to the frame, at least one first wheel, and at least one second wheel. Each of the at least one first wheel is provided with a fender disposed around a portion of each of the at least one first wheel. Each fender includes: an arcuate fender body and a brace. The fender body has an inner surface and an outer surface. The inner surface faces the first wheel. The brace has a first end and a second end. The first end is disposed on and connected to the outer surface of the fender body. The second end is connected to a wheel support structure of the first wheel. The second end is spaced from the fender body and is disposed closer to a rotation axis of the first wheel than the first end.

In an additional aspect, the at least one first wheel is two first wheels disposed on opposite sides of a longitudinal centerline of the vehicle. For each fender, the second end of the brace is disposed laterally inward of its corresponding first wheel.

In a further aspect, the two first wheels are two front wheels and the at least one second wheel is a single rear wheel.

In an additional aspect, each fender further includes a fender side portion connected to a side of the fender body and disposed laterally inward of its corresponding first wheel. For each fender, a portion of the brace located between the first and second ends of the brace is disposed between the fender side portion and its corresponding first wheel.

In a further aspect, a vehicle body is connected to the frame. The at least one first wheel is two first wheels disposed on opposite sides of a longitudinal centerline of the vehicle and being laterally spaced from the vehicle body.

In an additional aspect, each fender further includes a cover disposed on the outer surface of the fender body. The cover covers at least the first end of the brace. The first end of the brace is disposed between the cover and the outer surface of the fender body.

In a further aspect, each fender further includes at least one reflector disposed on the cover.

In an additional aspect, for each fender, the brace is a first brace. Each fender further includes: a second brace having a first end and a second end, the first end of the second brace being disposed on and connected to the outer surface of the fender body, the second end being connected to a wheel support structure of the first wheel, the second end being spaced from the fender body and being disposed closer to the rotation axis of the first wheel than the first end. For each fender, second ends of the first and second braces are disposed on a same side of their corresponding first wheel.

In a further aspect, for each fender, the second end of the first brace is disposed forward of the rotation axis of its corresponding first wheel and the second end of the second brace is disposed rearward of the rotation axis of its corresponding first wheel.

In an additional aspect, each of the at least one first wheel includes a tire. For each fender, a portion of the fender is disposed radially inward of an inner circumference of its corresponding tire, laterally outward of a plane containing a laterally inward surface of its corresponding tire, and rearward of the rotation axis of its corresponding first wheel.

In a further aspect, each fender further includes a fender side portion connected to a side of the fender body and disposed laterally inward of its corresponding first wheel. The portion of the fender includes a radially inward edge of the fender side portion.

In an additional aspect, each of the at least one first wheel is operatively connected to the frame by an upper A-arm and a lower A-arm. The portion of the fender is disposed vertically below the upper A-arm.

In a further aspect, each fender further includes a fender side portion connected to a side of the fender body and disposed laterally inward of its corresponding first wheel. The portion of the fender includes a radially inward edge of the fender side portion.

For purposes of this application, terms related to spatial orientation such as, but not limited to, left, right, forward, rearward, above and below should be understood as they would be understood by a driver sitting in/on the vehicle in a normal driving position. When referring to a fender alone, the terms related to spatial orientation should be understood as they would be understood when the fender is mounted on a wheel connected to the vehicle and oriented in a straight ahead orientation (i.e. not steered left or right).

Embodiments of the present invention each have at least one of the above-mentioned object and/or aspects, but do not necessarily have all of them. It should be understood that some aspects of the present invention that have resulted from attempting to attain the above-mentioned object may not satisfy this object and/or may satisfy other objects not specifically recited herein.

Additional and/or alternative features, aspects and advantages of embodiments of the present invention will become apparent from the following description, the accompanying drawings and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION

Fenders 100 and 200 will be described below as being disposed on front steerable wheels of a three-wheeled vehicle 10. However it is contemplated that the fenders 100 and 200 could be disposed on rear wheels, on non-steerable wheels, and/or on vehicle having two, four, or more wheels.

Figure 1:
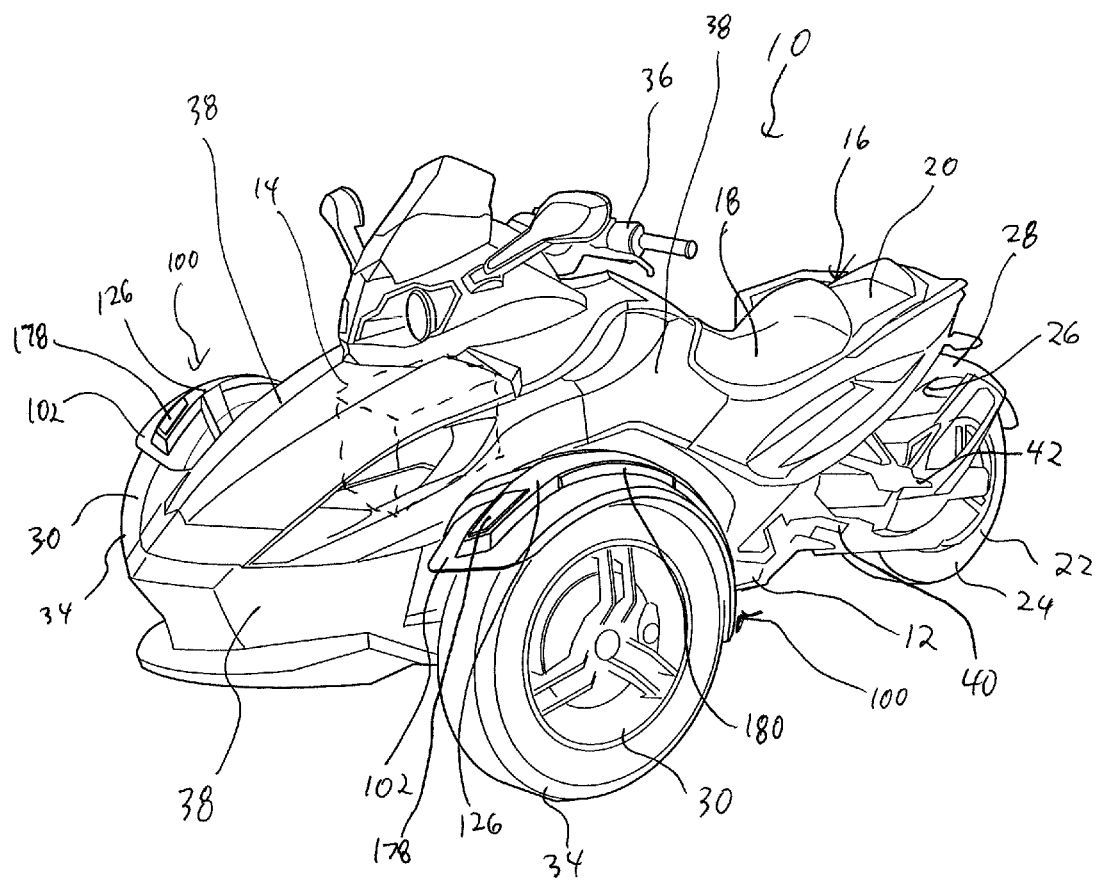
FIG. 1 is a perspective view taken from a front, left side of a three-wheeled vehicle.

As can be seen in FIG. 1, the vehicle 10 includes a frame 12 that supports a motor 14 (schematically shown), which could be any type of suitable power source such as, but not limited to, an electric motor, an internal combustion engine, or a hybrid system. A straddle seat 16 is mounted on the frame 12 and has a driver seat portion 18 and a passenger seat portion 20 disposed behind the driver seat portion 18. A single rear wheel 22 with a tire 24 suitable for road use is suspended via a rear suspension 26 at the rear of the frame 12 and is operatively connected to the motor 14 through a transmission including a gearbox and belt drive, although any suitable power transmission mechanism (e.g. continuously-variable transmission, chain drive, driveshaft assembly, etc.) could be used. A fender 28 is disposed on the rear wheel 22. A pair of front wheels 30 is suspended from the front of the frame 12 through double A-arm suspensions 32 (FIG. 2), which will be described in greater detail below. The front wheels 30 have tires 34 suitable for road use mounted thereon. A handlebar 36 is operatively connected to the front wheels 30 to steer the vehicle 10. Fenders 100 are disposed on the front wheels 30. The fenders 100 will be described in greater detail below. Multiple body panels 38 (only some of which have been numbered in FIG. 1) are connected to the fame 12 to form the vehicle body and house therein various components of the vehicle 10 such as the motor 14. As can be seen, the front wheels 30 are laterally spaced from the vehicle body. Foot pegs 40, 42 are connected to each side of the frame 12 below the straddle seat 16 and rearward of the front wheels 30. The foot pegs 40, 42 receive the feet of the driver and passenger thereon. It is contemplated that the foot pegs 40, 42 could be replaced by foot rests in the form of plates or any other suitable element capable of supporting the driver's and passenger's feet.

Figure 2:
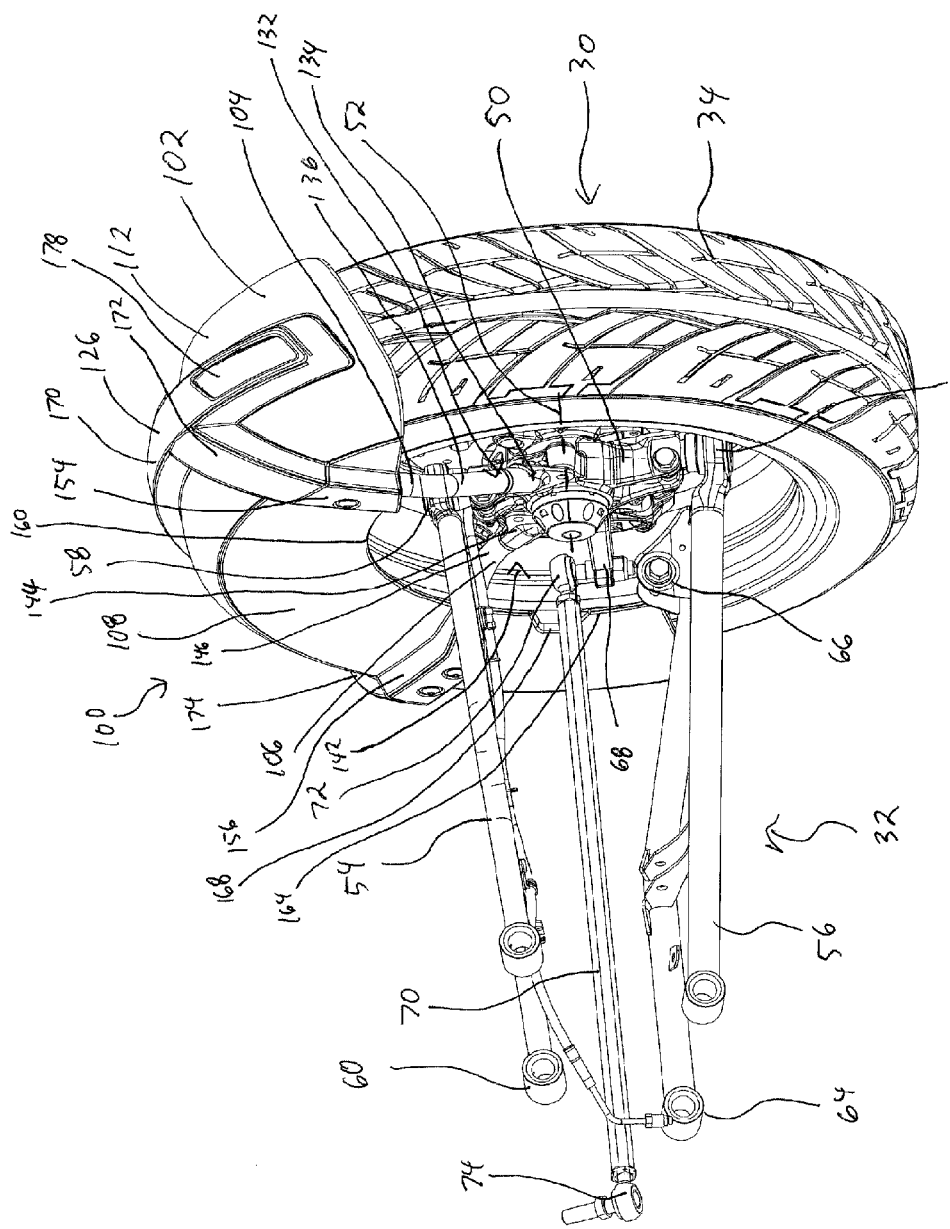
FIG. 2 is a perspective view taken from a front, right side of a left wheel, fender, suspensions arms, and steering rod of the vehicle of FIG. 1.
Figure 3:
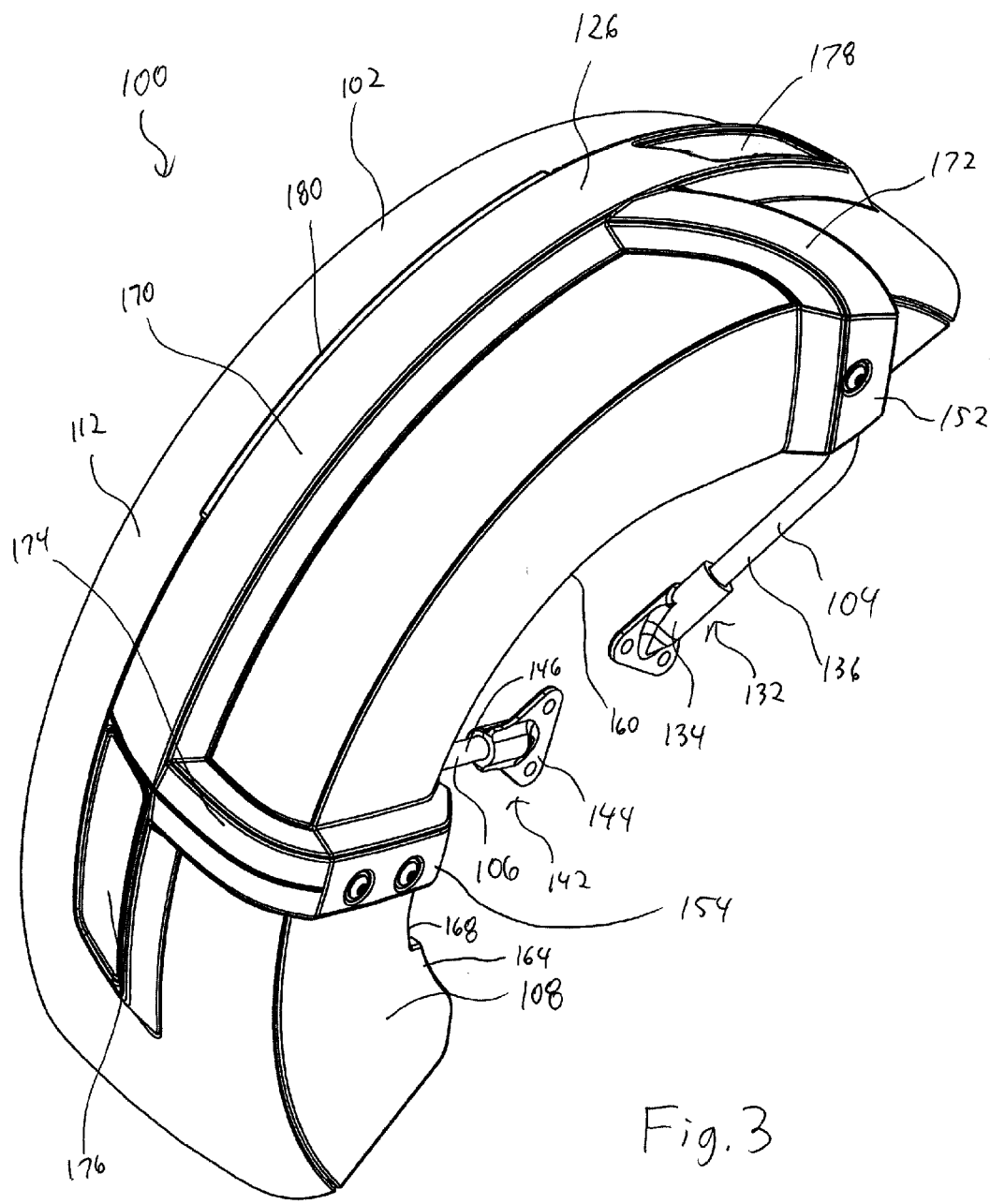
FIG. 3 is a perspective view taken from a rear, right side of the left fender of the vehicle of FIG. 1.

Turning now to FIG. 2, the manner in which the front left wheel 30 is connected to the frame 12 will be described. The front right wheel 30 is connected in the same manner and, for simplicity, its connection to the frame 12 will not be described.

The axle (not shown) of the wheel 30 is received inside bearings (not shown) housed in a spindle 50. The axle defines the rotation axis 52 of the wheel 30. The spindle is connected to the frame 12 via the double A-arm suspensions 32. The double A-arm suspension 32 includes an upper A-arm 54, a lower A-arm 56, and a shock absorber (not shown). The upper A-arm 54 is pivotally connected to the top of the spindle 50 at its distal end 58 and to the frame 12 at its proximal end 60. The lower A-arm 56, disposed below the upper A-arm 54, is pivotally connected to the bottom of the spindle 50 at its distal end 62 and to the frame 12 at its proximal end 64. A line (not shown) passing through the rotation centers of the distal ends 58, 62 of the upper and lower A-arms 54, 56 defines the steering axis of the wheel 30. The lower end of the shock absorber is pivotally connected to a bracket 66 on the lower A-arm 56. The upper end of the shock absorber is pivotally connected to the frame 12 above the proximal end 60 of the upper A-arm 54. It is contemplated that other types of suspensions could be used.

The spindle 50 defines a steering arm 68 extending rearward. A steering rod 70 is pivotally connected at its distal end 72 to the steering arm 68 and at its proximal end 74 to a pitman arm (not shown). The pitman arm is connected to the lower end of a steering column (not shown). The upper end of the steering column is connected to the handlebar 36. As a result, when the handlebar 36 is turned, the wheel 30 is steered. It is contemplated that other types of steering systems could be used, such as, but not limited to, a rack-and-pinion system. It is also contemplated that the vehicle 10 could be provided with a power steering system.

Turning now to FIGS. 2 to 6, the left fender 100 will be described. The right fender 100 is mirror image of the left fender 100, and therefore it will not be described in detail herein. It is contemplated that the left and right fenders 100 could not be mirror images of each other.

The fender 100 has an arcuate fender body 102 connected by two braces 104, 106 to the spindle 50 as will be described in greater detail below. A fender side portion 108 is connected to the right side of the fender body 102 to cover a portion of a right side of the left wheel 30, as will also be described in greater detail below. It is contemplated that a fender side portion could also be provided on a left side of the fender body 102 to cover a portion of a left side of the left wheel 30.

The fender body 102 is made of thin, lightweight material such as, but not limited to, sheet metal, plastic, fiberglass and carbon fiber. However, it is contemplated that the fender body could be made thicker and of any sufficiently strong material. The fender body 102 is shaped such that its inner surface 110 generally follows the shape of the tire 34. The outer surface 112 of the fender body has a raised portion 114 on a top thereof and another raised portions 116 at a rear thereof. The raised portions 114, 116 are generally laterally centered on the fender body 102. The raised portions 114, 116 provide attachment surfaces for the braces 104, 106 respectively. The outer surface 112 of the fender body also defines laterally extending channels 118, 120 (FIG. 6) to receive portions of the braces 104, 106 respectively. The outer surface 112 of the fender body 102 also has raised portions 122, 124 used to connect a cover 126 to the fender body 102 as will be described in greater detail below.

Figure 4:
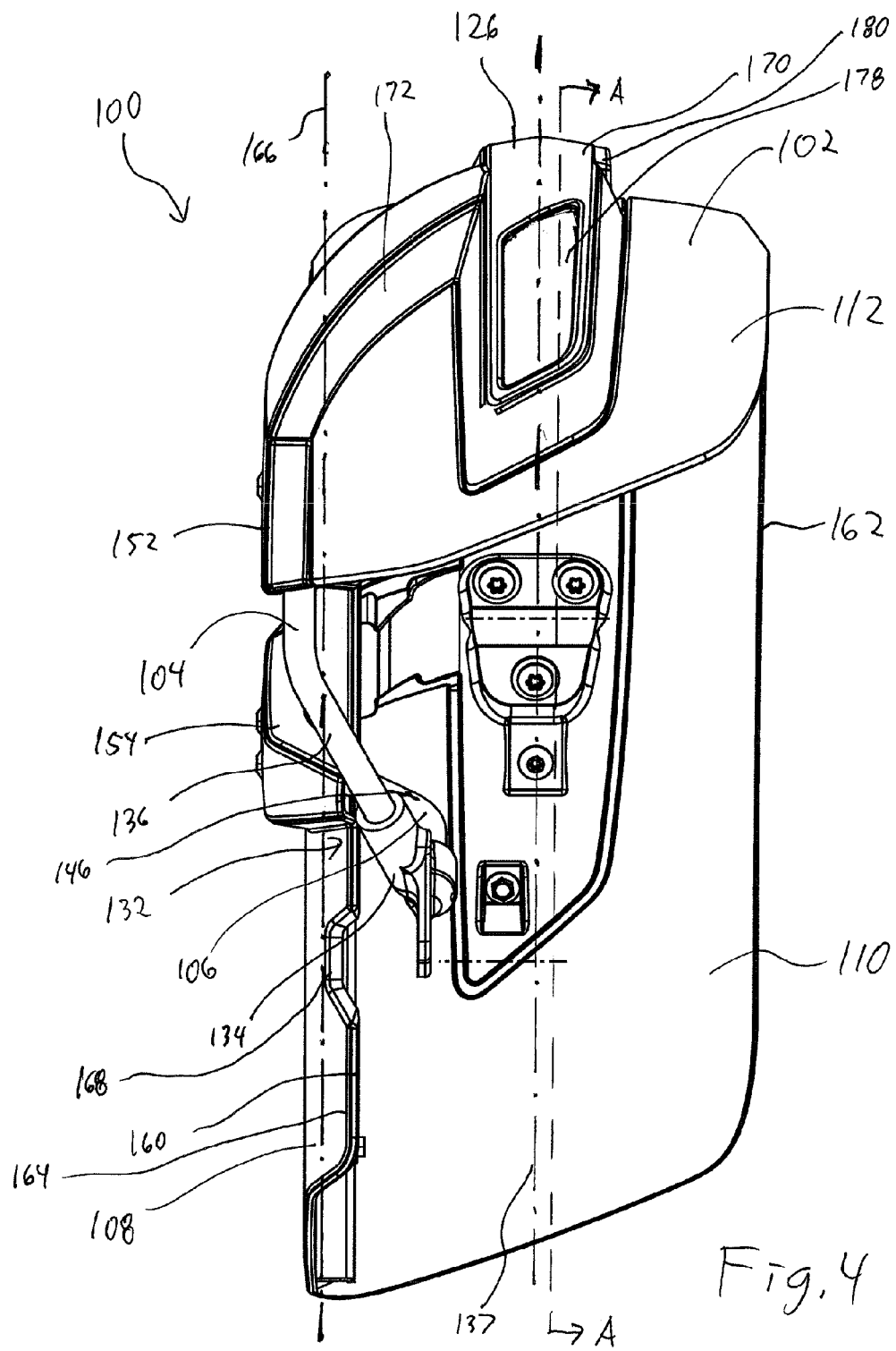
FIG. 4 is a front elevation view of the fender of FIG. 3.
Figure 5:
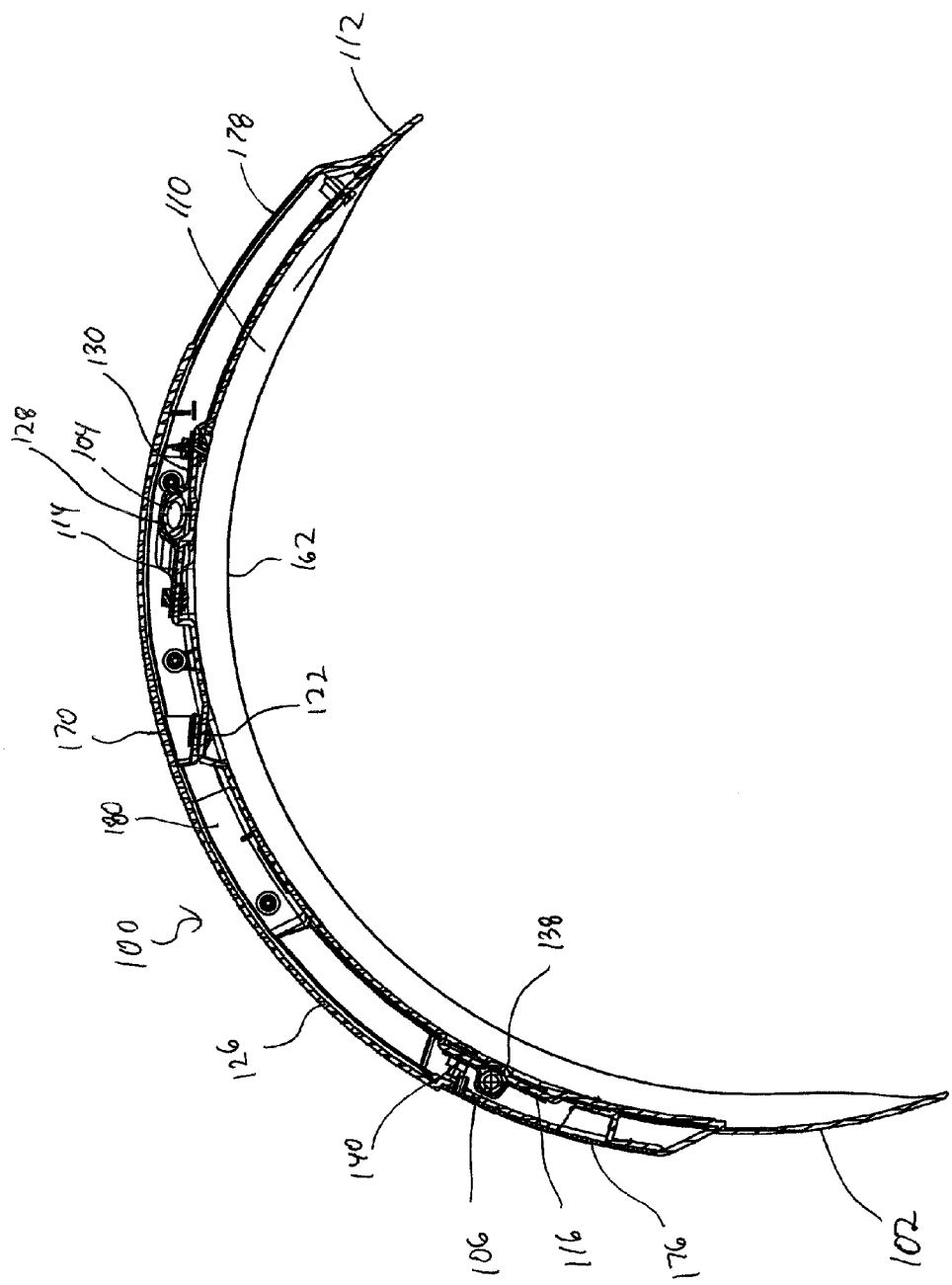
FIG. 5 is a longitudinal cross-section of the fender of FIG. 3 taken through line A-A of FIG. 4.
Figure 6:
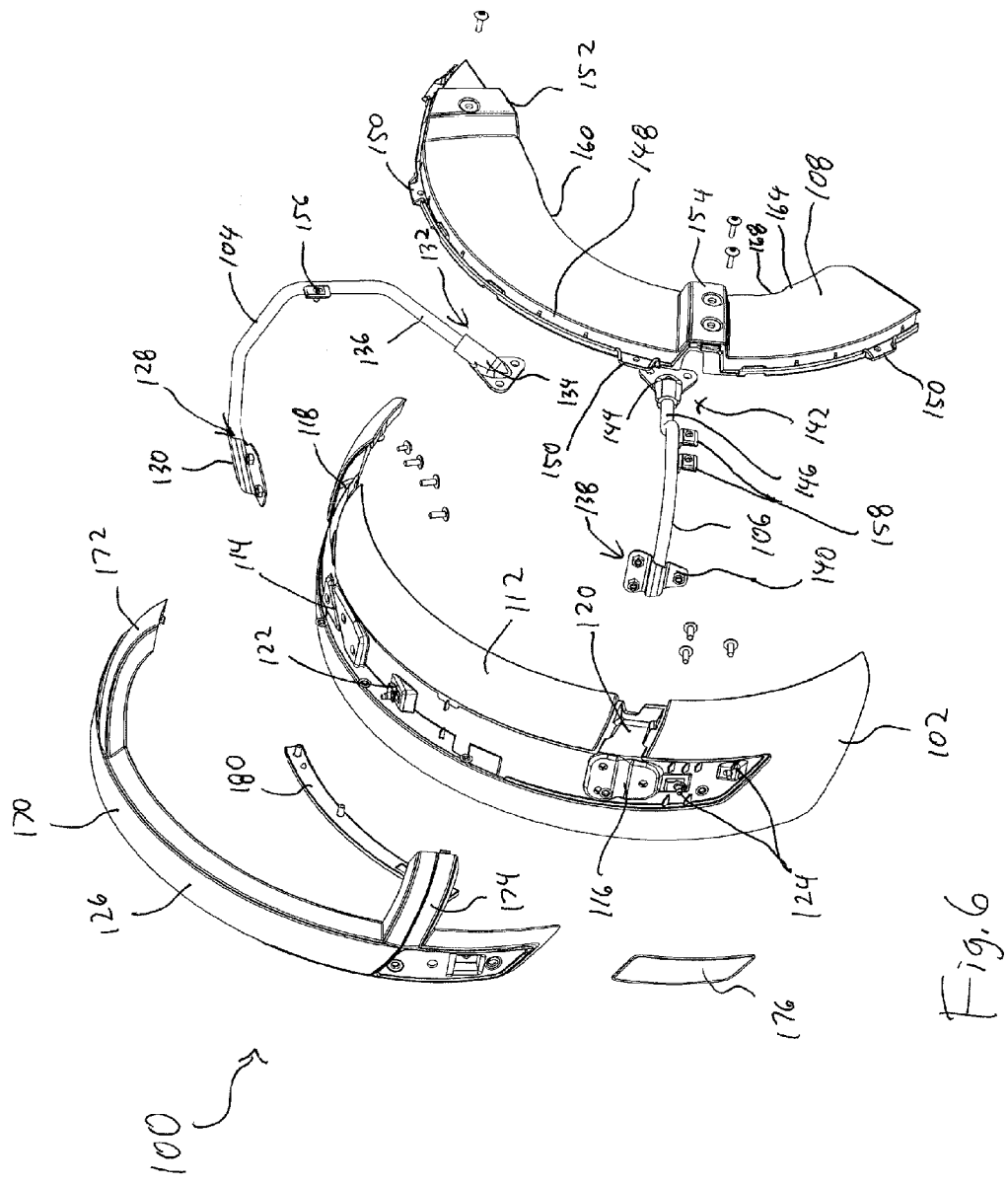
FIG. 6 is an exploded view of the fender of FIG. 3.

The brace 104 has a first end 128 provided with a retaining plate 130 having a notch to receive the end 128 therein. To attach the brace 104 to the fender body 102, the end 128 is placed on the raised portion 114, the retaining plate 130 is then placed over the end 128, and the retaining plate 130 is finally fastened with nuts and bolts passing through apertures in the raised portion 114 and the retaining plate 130. As best seen in FIG. 5, the raised portion 114 creates an indentation in the inner surface 110 of the fender body 102. As a result, the heads of the bolts used to fasten the first end 128 of the brace 104 to the fender body 102 are recessed relative to the adjoining portions of the inner surface 110 of the fender body 102. From the first end 128, the brace 104 extends laterally inward (i.e. toward the right) inside the channel 118. The brace 104 then extends generally radially inwardly (i.e. generally downward) such that its second end 132 can be fastened to the spindle 50 as shown in FIG. 2. As can be seen, the second end 132 is connected to the spindle 50 at a position forward of and above the rotation axis 52 of the left wheel 30. A sleeve 134 is fixedly connected over the second end 132 and provides a plate having apertures. Threaded fasteners (not shown) are inserted through the apertures in the plate of the sleeve 134 and corresponding apertures in the spindle 50 to fasten the brace 104 to the spindle 50. As can be seen in FIGS. 2 and 4, the portion 136 of the brace 104 extends toward the longitudinal center plane 137 (FIG. 4) of the fender body 102. As a result, a portion of the brace 104 including the second end 132 and the sleeve 134 are located behind the front portion of the tire 34, thus reducing the amount of drag it generates.

The brace 106 has a first end 138 provided with a retaining plate 140 having a notch to receive the end 138 therein. To attach the brace 106 to the fender body 102, the end 138 is placed on the raised portion 116, the retaining plate 140 is then placed over the end 138, and the retaining plate 140 is finally fastened with nuts and bolts passing through apertures in the raised portion 116 and the retaining plate 140. As best seen in FIG. 5, the raised portion 116 creates an indentation in the inner surface 110 of the fender body 102. As a result, the heads of the bolts used to fasten the first end 138 of the brace 106 to the fender body 102 are recessed relative to the adjoining portions of the inner surface 110 of the fender body 102. From the first end 138, the brace 106 extends laterally inward (i.e. toward the right) inside the channel 120. The brace 106 then extends generally radially inwardly (i.e. generally forward) such that its second end 142 can be fastened to the spindle 50 as shown in FIG. 2. As can be seen, the second end 142 is connected to the spindle 50 at a position rearward of and above the rotation axis 52 of the left wheel 30. A sleeve 144 is fixedly connected over the second end 142 and provides a plate having apertures. Threaded fasteners (not shown) are inserted through the apertures in the plate of the sleeve 144 and corresponding apertures in the spindle 50 to fasten the brace 106 to the spindle 50. As can be seen in FIGS. 2 and 4, the portion 146 of the brace 106 extends toward the longitudinal center plane 137 (FIG. 4) of the fender body 102. As a result, a portion of the brace 106 including the second end 142 and the sleeve 144 are located behind the front portion of the tire 34, thus reducing the amount of drag it generates.

The braces 104, 106 are metallic tubes. It is contemplated that the braces 104, 106 could have any type of cross-section and be made of any other material providing the rigidity necessary to maintain the fender 100 in position over the wheel 30. By fastening the braces 104, 106 to the outer surface 112 of the fender body 102, the inner surface 110 of the fender body can be located closer to the wheel 30 compared to prior art embodiments where the braces are disposed on and fastened to the inner surface of the fender body 102. It is contemplated that only a single brace could be used. It is also contemplated that three of more braces could be used. It is contemplated that the braces could be fastened to wheel supporting structures other than the spindle 50.

The fender side portion 108 is made of the same thin and lightweight material as the fender body 102, but it is contemplated that it could be made of a different material. The fender side portion 108 is connected to the right side of the fender body 102 so as to cover a portion of the right side of the left wheel 30. The fender side portion 108 also covers portions of the braces 104, 106 such that these portions are disposed between the fender side portion 108 and the longitudinal center plane 137. The radially outward edge 148 (FIG. 6) of the fender side portion 108 is provided with tabs 150 having apertures. Fasteners are inserted in the apertures in the tabs 150 and in corresponding apertures (not shown) in the fender body 102 to fasten the fender side portion 108 to the fender body 102. The fender side portion 108 has indentations 152, 154 receiving portions of the braces 104, 106 respectively therein. The indentations 152, 154 have apertures defined therein. Fasteners are inserted through the apertures of the indentations 152, 154 and through corresponding apertures defined in threaded inserts 156, 158. The threaded inserts 156, 158 are mounted on tabs having corresponding apertures and that extend from the braces 104, 106. As such, the fender side portion 108 is also fastened to the braces 104, 106.

As can be seen in FIG. 4, portions of the radially inward edge 160 of the fender side portion 108 disposed on either sides of the indentations 152, 154 are disposed between the portions of the braces 104, 106 that are covered by the fender side portion 108 and the center plane 137. As can also be seen in FIG. 4, the radially inward edge 160 of the fender side portion 108 is disposed more radially inward (i.e. closer to the rotation axis 52) than the radially inward edge 162 of the left side of the fender body 102. As can be seen in FIG. 2, a radially inward portion 164 of a rear portion of the fender side portion 108, including the radially inward edge 160 at that location, curves over of the right side of the tire 34 toward the center plane 137. The portion 164 is radially inward of the inner circumference of the wheel 34 and extends to the left of a plane 166 (FIG. 4) containing the right side of the tire 34. As a result, the portion 164 is located behind the front of the tire 34 thereby reducing the likelihood of incoming air entering between the portion 164 and the tire 34 and reducing drag. The portion 164 is located vertically between the two A-arms 54, 56. The portion 164 also has an indentation 168 so as not to interfere with the steering rod 70. It is contemplated that the fender side portion 108 could be omitted.

The cover 126 is made of the same thin and lightweight material as the fender body 102, but it is contemplated that it could be made of a different material. The cover 126 has a longitudinally extending portion 170 and two side branches 172, 174 extending generally laterally to the right. The portion 170 of the cover 126 covers the first ends 128, 138 of the braces 104, 106, their corresponding retaining plates 130, 140 and associated fasteners such that they are disposed between the cover 126 and the outer surface 112 of the fender body 102. The side branch 172 is disposed over the channel 118 and covers the portion of the brace 104 located in the channel 118. The end of the branch 172 abuts the upper end of the indentation 152. The end of the branch 172 and the upper end of the indentation 152 have matching external profiles such that it looks like the indentation 152 is a continuation of the branch 172. Similarly, the side branch 174 is disposed over the channel 120 and covers the portion of the brace 106 located in the channel 120. The end of the branch 174 abuts the rear end of the indentation 154. The end of the branch 174 and the rear end of the indentation 154 have matching external profiles such that it looks like the indentation 154 is a continuation of the branch 174. It is contemplated that the cover 126 could be replaced with multiple covers such as for example a first cover to cover the first end 128 of the brace 104, the retaining plate 130 and its associated fasteners and a second cover to cover the first end 138 of the brace 106, the retaining plate 140 and its associated fasteners. It is also contemplated that the cover 126 could be omitted.

The cover 126 is fastened to the outer surface 112 of the fender body 102 by fasteners inserted through apertures in the portion 170 of the cover 126 and corresponding apertures in the raised portions 122, 124. A reflector 176 is connected on the rear of the portion 170 over the fasteners fastened to the portions 124 so as to conceal them. A reflector 178 is connected to a front of the portion 170 of the cover 176. Another reflector 180 is connected to a left side of the portion 170 of the cover 176.

Figure 7:
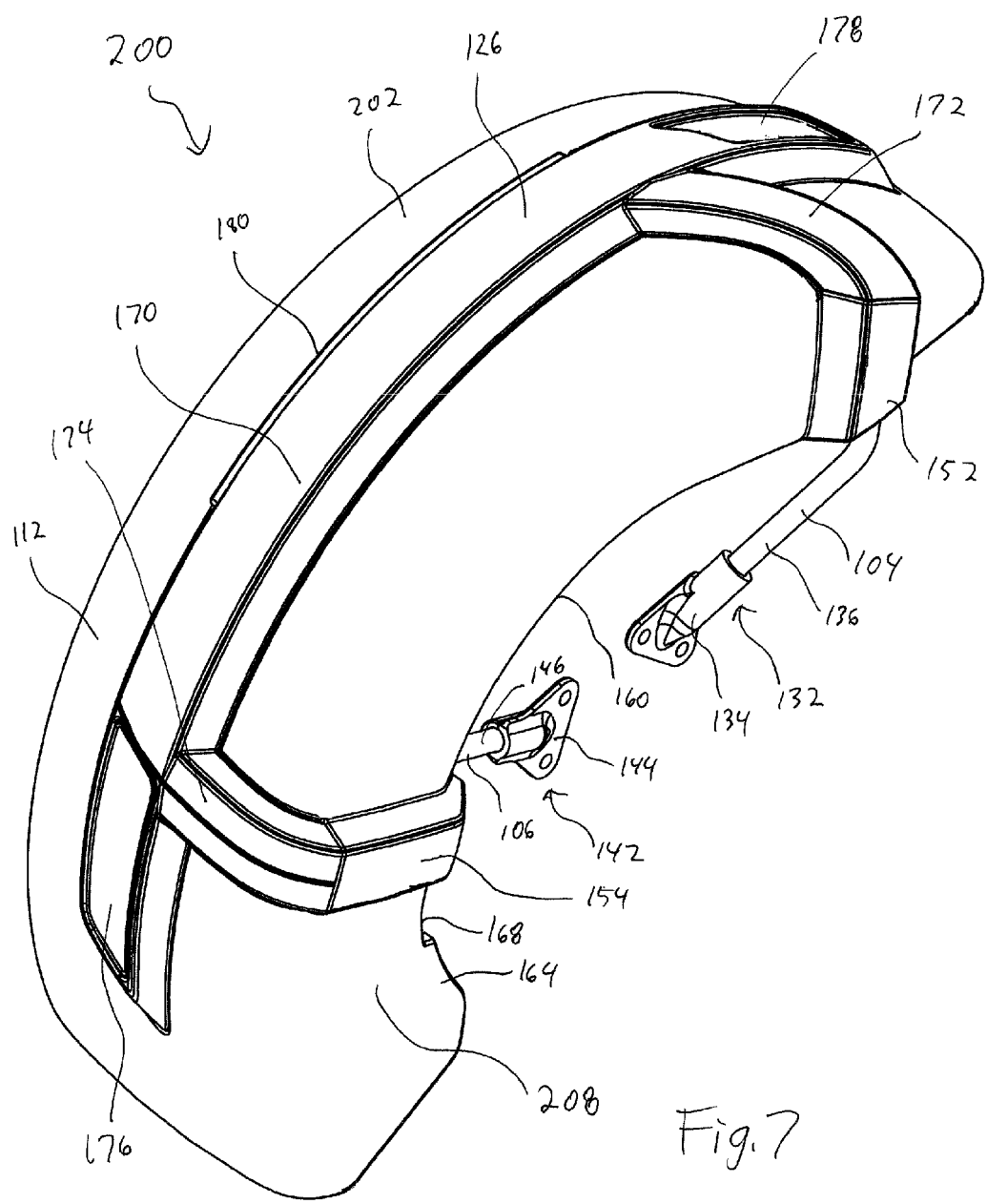
FIG. 7 is a perspective view taken from a rear, right side of an alternative embodiment of the fender of FIG. 3.

FIG. 7 illustrates a left fender 200 that is an alternative embodiment of the left fender 100 described above. In this embodiment, the fender body 102 and the fender side portion 108 are replaced by a fender body 202 and a fender side portion 208 respectively. The other elements of the fender 200 are similar to those of the fender 100 described above and have been labeled with the same reference numbers in the figure. For simplicity, the elements of the fender 200 that are similar to those of the fender 100 will not be described again. The fender body 202 and the fender side portion 208 are integrally formed as a single part. As a result, the fender side portion 208 does not need to be fastened to the braces 104, 106 and the indentations 152, 154 are not provided with apertures. It is contemplated that the fender side portion 208 could be fastened to the braces 104, 106 in a manner similar to the one described above with respect to the fender 100. It is contemplated that the indentations 152, 154 could be separate parts that are fastened or otherwise connected to the fender side portion 208 and/or their respective braces 104, 106. It is also contemplated that the indentations 152, 154 could be omitted and that the branches 172, 174 of the cover 126 could be extended so as to cover the portions presently covered by the indentations 152, 154.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A fender for a wheeled vehicle comprising:
   an arcuate fender body having an inner surface and an outer surface, the inner surface being adapted to face a wheel of the vehicle;
   a fender side portion connected to a side of the fender body; and
   a brace having a first end and a second end, the first end being disposed on and rigidly connected to the outer surface of the fender body, the second end being adapted to connect to the vehicle, the second end being spaced from the fender body and being disposed radially inward of the first end, a portion of the brace located between the first and second ends of the brace being disposed between the fender side portion and a longitudinal center plane of the fender body.

2. The fender of claim 1, wherein the fender side portion is removably connected to the side of the fender body on a first side of the fender; and wherein a radially inward edge of the fender side portion is more radially inward than a radially inward edge of a second side of the fender opposite the first side.

3. The fender of claim 1, wherein the fender side portion is fastened to the portion of the brace.

4. The fender of claim 1, wherein at least a portion of a radially inward edge of the fender side portion is disposed between the portion of the brace and the longitudinal center plane of the fender body.

5. The fender of claim 1, wherein the fender side portion and the fender body are integrally formed.

6. The fender of claim 1, further comprising a cover disposed on the outer surface of the fender body, the cover covering at least the first end of the brace, the first end of the brace being disposed between the cover and the outer surface of the fender body.

7. The fender of claim 6, wherein the first end of the brace is fastened by fasteners to the fender body; and wherein the cover covers the fasteners.

8. The fender of claim 6, further comprising at least one reflector disposed on the cover.

9. The fender of claim 8, wherein the cover is fastened by fasteners to the fender body; and wherein the reflector is disposed over at least one of the fasteners.

10. The fender of claim 1, wherein the brace is a first brace; and further comprising a second brace having a first end and a second end, the first end of the second brace being disposed on and connected to the outer surface of the fender body, the second end of the second brace being adapted to connect to the vehicle, the second end of the second brace being spaced from the fender body and being disposed radially inward of the first end of the second brace.

11. The fender of claim 10, further comprising a cover disposed on an outer surface of the fender body, the cover covering at least the first ends of the first and second braces, the first ends of the first and second braces being disposed between the cover and the outer surface of the fender body.

12. The fender of claim 10, wherein second ends of the first and second braces are disposed on a same side of a longitudinal centerline of the fender body.

\* \* \* \* \*